June 10, 1930. P. E. CHAPMAN 1,763,389
ICE CREAM SPOON
Filed Aug. 4, 1924
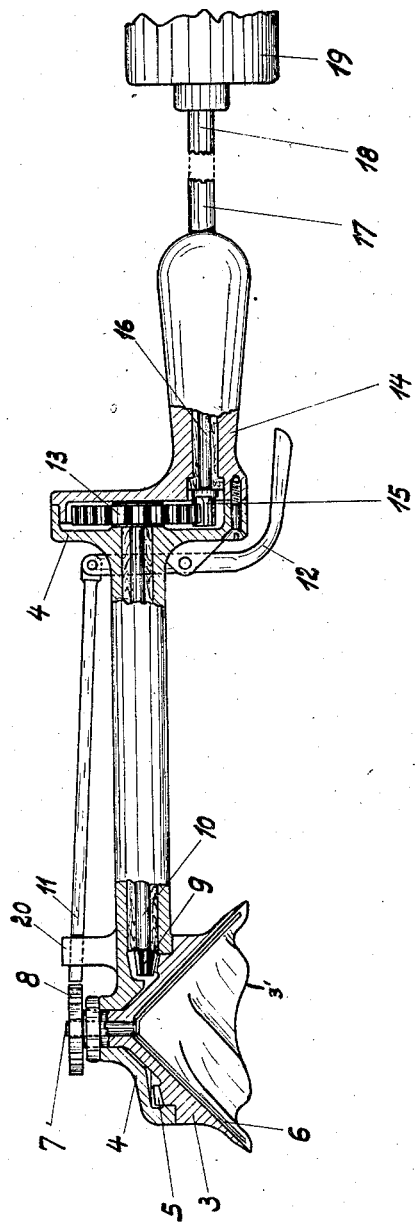
Penrose E. Chapman
Inventor Patented June 10, 1930

1,763,389

UNITED STATES PATENT OFFICE

PENROSE E. CHAPMAN, OF ST. LOUIS, MISSOURI

ICE-CREAM SPOON

Application filed August 4, 1924. Serial No. 730,021.

The object of my invention is to decrease the labor required in dishing ice cream and similar materials and particularly relates to improvements in spoons for dishing or ladling ice cream and similar substances.

In the drawing the figure is a sectional view of an ice cream spoon embodying my invention.

It is well known how the linear movement of a knife aids cutting, and how a similar movement of a forming tool or its work aids forming.

In this device I utilize these phenomena to overcome the resistance to dishing or cutting a portion from a mass of ice cream or similar substances and the term "ice cream" will be herein used to include all such substances.

In a preferred form I accomplish my object by rotatably mounting the bowl 3 in the end of the arm 4.

On the outer surface of the bowl 3 a bevel gear 5 is attached which operates with a bevel gear 9 on jack shaft 10 driven in turn by a pair of gears 13, 15. The gear 15 is attached to the shaft 16 mounted in the handle 14 in turn connected by the flexible shaft 17 to shaft 18 of a mechanical source of power as motor 19 which supplies the power required to operate the spoon.

The gears 5 and 9 come in contact with the ice cream occasionally and may be covered, as by forming the arm or handle 4 to cover said gears.

For discharging the ice cream I prefer to place within the bowl a scraper 6 carried by a shaft 7 journaled in the bottom of the bowl 3. The upper end of this shaft 7 is provided with an arresting wheel 8. By pulling the trigger 12 the rod or dog 11 which is supported by bearing 20 engages this wheel thereby holding the scraper rigid, while the bowl revolves cutting the contents loose.

In operation, the device is handled the same as any other ice cream spoon, but the labor will be greatly reduced as the motor will do most of the work.

There are many other modifications of my device that may be made without departing from the spirit of my invention.

Having now described my invention I wish to claim—

An ice-cream spoon comprising a support including a handle, a rotatable bowl at one end of said support, a shaft passing through said bowl, a rotatable scraper within said bowl attached to one end of said shaft, an arresting wheel at the other end of said shaft, means to rotate said bowl about said shaft, trigger means adjacent the handle, and means actuated by said trigger means for stopping the motion of said wheel.

In testimony whereof I hereunto affix my signature this 1st day of August, 1924.

PENROSE E. CHAPMAN.